United States Patent [19]
Pointner

[11] Patent Number: 4,776,143
[45] Date of Patent: Oct. 11, 1988

[54] ANCHOR

[76] Inventor: Ferdinand Pointner, Tagwerkerstrasse 34, A-4810 Gmunden, Austria

[21] Appl. No.: 61,878

[22] Filed: Jun. 11, 1987

[30] Foreign Application Priority Data

Jun. 16, 1986 [AT] Austria .................. 1623/86

[51] Int. Cl.⁴ .............................................. E04B 1/02
[52] U.S. Cl. ........................................ 52/506; 52/509; 52/565; 52/704; 411/15; 411/51; 411/258; 405/260
[58] Field of Search ................... 52/506, 509, 698–704, 52/235, 565; 411/15, 16, 17, 51, 49, 82, 44, 258, 930; 405/260, 261

[56] References Cited

U.S. PATENT DOCUMENTS

| | | | |
|---|---|---|---|
| 1,958,674 | 5/1934 | Nusbaum | 411/15 X |
| 2,955,504 | 10/1960 | Lovrinch et al. | 411/51 |
| 3,308,585 | 3/1967 | Fischer | 52/704 X |
| 3,896,627 | 7/1975 | Brown | 405/261 |
| 4,158,519 | 6/1979 | Gamlin | 405/260 |
| 4,299,515 | 11/1981 | Yates et al. | 405/261 X |
| 4,631,889 | 12/1986 | Adam et al. | 52/704 X |

FOREIGN PATENT DOCUMENTS 153690 10/1953 Australia ..................... 52/704

OTHER PUBLICATIONS

Mauerwerk–Abfangkonsole Typengepruft entspricht der DIN 1053 Werkstoff Nr. 1 4571.
Vezzani S.p.A. Acciaio inox aisi 304 (2 pages).
Ferdinand Pointner Patentanmeldung, Ser. No. 07/061,878 (4 pages).

*Primary Examiner*—David A. Scherbel
*Assistant Examiner*—Richard E. Chilcot, Jr.
*Attorney, Agent, or Firm*—Herbert Dubno

[57] ABSTRACT

An anchor for use in slab facings comprises an anchor bolt (2), which has an inner end that is adapted to be inserted into and to be embedded in mortar in a hole (6) formed in a wall (7) to be faced and an outer end provided with a transverse rod (1) for insertion into at least one bore formed in at least one edge face of at least one facing slab (9). To ensure that the anchor can be economically fixed and that the facing slabs can be mounted quickly, the anchor bolt (2) is provided at its inner end with a cylindrical enlarged portion (4), which has an embossed or channeled peripheral surface, and the anchor bolt is provided between the transverse rod (1) and the enlarged portion (4) with a driving sleeve (3), which is slidably mounted on the bolt and has a serrated or finned surface, which is larger in outside diameter than the enlarged portion (4).

10 Claims, 1 Drawing Sheet

ANCHOR

FIELD OF THE INVENTION

This invention relates to an anchor for use in slab facings, particularly stone slab facings on facades, which anchor consists of an anchor bolt having an inner end portion, which is adapted to be inserted into and be embedded in mortar in a hole in a wall, and an outer end portion, which is provided with a transverse rod for insertion into at least one bore in an edge face of at least one facing slab.

BACKGROUND OF THE INVENTION

Anchors are used to fix each facing slab exactly in a predetermined position relative to a wall to be faced. In previous practice, anchors consisting of straight metal bolts, which were optionally twisted or profiled to increase their stiffness, were embedded in mortar in the wall to an appropriate depth, which was so selected that the associated slab was mounted in proper alignment. When the slabs are to be fixed quickly, delays should be avoided so that the anchors should be fixed as quickly as possible. This requires either the use of a rapid-setting cement mortar, which is expensive, or of additional metal pins, which are driven to support the anchor. For this reason the setting of the known anchors is rather time-consuming and complicated and requires either an expensive mortar or additional fastening means.

OBJECT OF THE INVENTION

It is an object of the invention to eliminate these disadvantages and to provide an anchor which can properly be embedded in mortar within a short time and permits facing slabs to be fixed exactly in position in an economical manner.

SUMMARY OF THE INVENTION

This object is accomplished in accordance with the invention in that the anchor bolt is provided on its inner end portion with an enlarged cylindrical portion, which has an embossed or channeled peripheral surface. The bolt is provided between the transverse rod and the enlarged portion with a slidably mounted driving sleeve, which has a serrated or finned outer peripheral surface, and the driving sleeve has a larger outside diameter than the enlarged portion.

When it is desired to fix said anchor, the hole in the wall is filled in part with cement mortar and the anchor is then driven into the hole by means of the driving sleeve to the depth which is required for a mounting of the facing slabs in proper positions. Owing to its large outside diameter and its profiled outside surface, the driving sleeve driven into the hole in the wall becomes stuck in the latter and cooperates with the enlarged portion that is contained in the borehole ahead of the sleeve so as to provide a anchor or reliable support reliable support for the anchor, which permits the slabs to be mounted without delay.

The cement mortar which has been displaced by the enlarged portion completely fills the hole in the wall at least near its inner end so that it is sufficient to use additional mortar only for filling the open outer end of the hole in the wall in order to complete the fixing of the anchor. Because the anchor is supported by the driving sleeve, the mounting of the slab will not be delayed by the time required for the setting of the cement mortar and it is possible to use even low-cost cement mortar.

When the mortar has set, the anchor is firmly fixed in the hole, as in the previous practice, and the enlarged portion embedded in the cement mortar ensures a particularly firm and reliable fixation of the anchor.

In a particularly desirable embodiment of the invention the driving sleeve is made of plastic and formed with a longitudinal slot that is open at both ends. Such driving sleeves can be made at low cost and may be clipped onto the bolt shortly before the anchor is set. Because the sleeves have a springlike resiliency they can easily be driven by impact into the boreholes and nevertheless ensure that the anchor will reliably be held until the cement mortar has set.

Within the scope of the invention the enlarged portion may consist of a metal sleeve, which is mounted on the anchor bolt by an interference fit or a welded joint. In that case the anchor belt can also be made economically and the metal sleeve can be formed with a rough surface. The diameter of the metal sleeve may be selected for an adaptation of the anchors to holes differing in size.

DETAILED DESCRIPTION OF THE PREFERRED EMBODIMENTS

Figure 1:
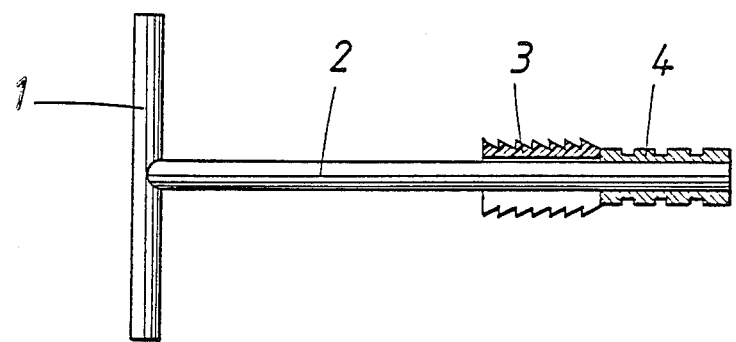
FIGS. 1 and 2 are elevational views, partly in section which show respective illustrative embodiments of anchors in accordance with the invention.
Figure 2:
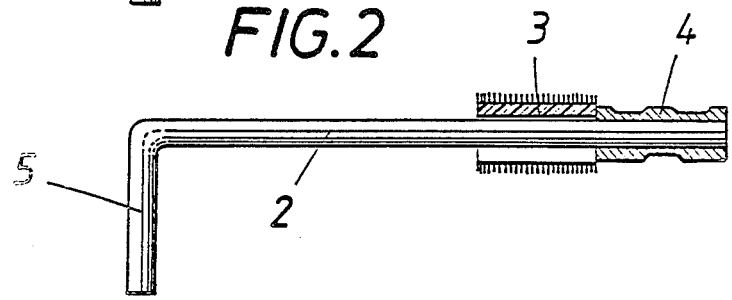

In accordance with FIG. 1, anchors used for an economical fixing of facing slabs comprise a metal anchor bolt 2, which is provided at its outer end with a transverse rod 1, which is welded to the bolt 2, and at its inner end has a cylindrical enlarged portion 4, which consists of a metal sleeve that is axially fixed to the bolt 2 by an interference fit or by a welded joint and has a channeled peripheral surface so that the outside peripheral surface of the enlarged portion 4 is formed with elevated and recessed surface portions. Between the transverse rod 1 and the enlarged portion 4, a driving sleeve 3 is slidably mounted on an intermediate portion of the anchor bolt 2. The enlarged portion 4 has a diameter greater than that of the intermediate portion of the bolt. That driving sleeve has a serrated outside peripheral surface which is larger in outside diameter than the enlarged portion 4. The outer diameter of the driving sleeve 3 is larger than the outside diameter of the enlarged portion 4. The inside diameter of the driving sleeve 3 is larger than the outside diameter of the bolt 2 but smaller than the outside diameter than the enlarged portion. In the embodiment shown in FIG. 2 the anchor bolt 2 is provided at its outer end with a transverse rod 5, which consists of an angled portion that is integral with the remainder of the bolt 2. The driving sleeve 3 has a finned outside peripheral surface. The enlarged portion 4 is constituted by a metal sleeve, which has an embossed outside peripheral surface.

Figure 4:
FIG. 4 is an end elevation showing a driving sleeve for use in an anchor in accordance with the invention.

As is apparent from FIG. 4 the driving sleeve 3 is made of plastic and is formed with a longitudinal slot, which is open at both ends so that the driving sleeve 3 can easily be clipped onto the anchor bolt 2 and will easily be slidable along the same.

Figure 3:
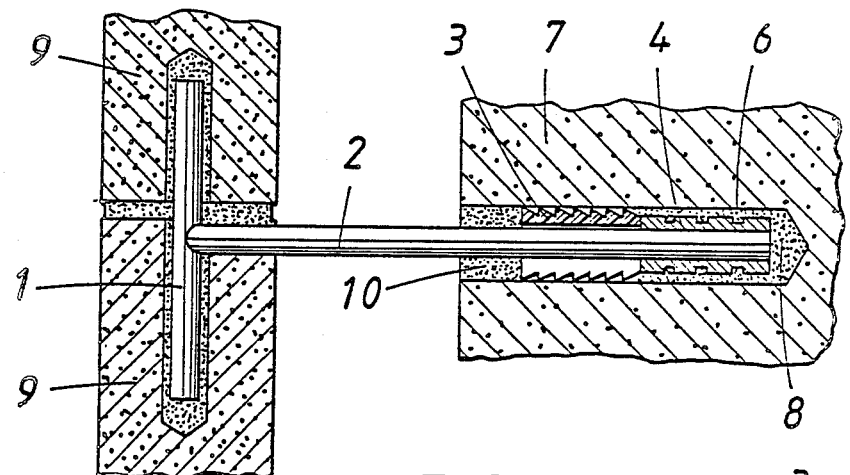
FIG. 3 is a sectional view showing an anchor which has been inserted into a wall and serves to fix facing slabs.

The mounting of facing slabs consisting, e.g., of stone slabs 9, will now be described with reference to FIG. 3. Each anchor bolt 2 is embedded in an appropriate depth in mortar contained in a hole 6 formed in the wall 7 which is to be faced. That depth is so selected that the transverse rods 1 can be inserted into bores formed in edge faces of the stone slabs 9 to hold the latter exactly in a desired position and alignment. Before the anchor is set, the hole 6 is filled at least in part with cement mortar 8. Thereafter the enlarged portion 4 of the anchor bolt 2 is inserted into the hole 6. The driving sleeve 3 is then struck with an appropriate tool, such as a sleeve-like striking tool, so that the anchor pin 2 can readily be driven into the borehole 6 to the desired depth because the driving sleeve 3 is struck that tools then struck with an appropriate tool, such so that the anchor pin 2 can readily be driven into the borehole 6 to the desired depth because the driving sleeve 3 strikes on the enlarged portion 4 and the anchor bolt 2 is thus driven by the driving sleeve 3 as it is struck by the tool.

For this purpose the metal sleeve 4 is axially fixed to the anchor belt 2 and at its axially outer end is formed with an generally radial end face facing the driving sleeve 3 and the driving sleeve 3 has an generally radial inner end face facing the outer end face of the metal sleeve 4. Said outer end face of the metal sleeve 4 and the inner end face of the driving sleeve 3 are adapted to abut so that the driving force exerted on the driving sleeve 3 will be transmitted to the metal sleeve 4 and from the latter to the anchor bolt 2. The driving sleeve 3 is larger in diameter than the hole 6 and the serrations or fins on its outside peripheral surface constitute generally peripherally extending, radially outwardly facing, elevated surfaces, which are axially spaced apart, so that said serrations or fins will interlock with the peripheral surface of the hole 6 so that the action of the driving sleeve 3 as it is struck will fix the anchor bolt 2 in the desired position. To complete the setting of the anchor, it will then be sufficient to close the hole 6 at its outer end with cement mortar 10. When the anchor has been set, it is immediately adapted to properly hold the stone slab or stone slabs 9 in position. Even before the cement mortar 8, 10 has been set, the driving sleeve 3 which is held in position in the hole 6 will sufficiently support the anchor so that a facing slab or slabs can be mounted on a given anchor even before the mortar has been set. When the mortar 8, 10 has been set, the presence of the enlarged portion 4 having a channeled or embossed surface will then ensure a reliable and strong fixation of the anchor in the wall 7 regardless of the action of the driving sleeve 3.

Whereas the anchor in accordance with the invention affords special advantages when used for fixing facing stone slabs, the term facing slabs used herein does not involve a restriction as regards the material and size of such slabs.

I claim:

1. In an anchor for mounting on a wall formed with a mortar-containing hole, at least one facing slab having an edge face, said anchor comprising:

an anchor bolt having an inner end portion adapted to be inserted into said mortar-containing hole, an outer end portion, which is provided with a transverse rod that is adapted to be fitted into said bore, and an intermediate portion between said inner end portion and said transverse rod, the improvement wherein said anchor bolt is provided on said inner end portion with a cylindrical enlarged portion, which is larger in diameter than said intermediate portion and has a peripheral surface formed with elevated and recessed surface portions, a driving sleeve is axially slidably mounted on said intermediate portion and is larger in outside diameter than said enlarged portion and has an inside diameter that is smaller in diameter than the outside diameter of said enlarged portion, and said driving sleeve has an outside peripheral surface that is formed with generally peripherally extending, radially elevated surface portions, which are axially spaced apart.

2. The improvement defined in claim 1, wherein said enlarged portion has an embossed peripheral surface.

3. The improvement defined in claim 1, wherein said enlarged portion has a channeled peripheral surface.

4. The improvement defined in claim 1, wherein said driving sleeve has a serrated outside peripheral surface.

5. The improvement defined in claim 1, wherein said driving sleeve has a finned outside peripheral surface.

6. The improvement defined in claim 1, wherein said driving sleeve is made of plastic and has a continuous longitudinal slot, which is open at both ends.

7. The improvement defined in claim 1, wherein said enlarged portion is constituted by a metal sleeve, which is axially fixed to said bolt.

8. The improvement defined in claim 7, wherein said metal sleeve is an interference fit on said bolt.

9. The improvement defined in claim 8 wherein said metal sleeve is connected to said bolt by a weld.

10. The improvement set forth in claim 1, wherein said enlarged portion has a radial end face facing said driving sleeve and said driving sleeve has a radial end face which faces and is adapted to abut said end face of said enlarged portion.

* * * * *